(12) United States Patent
Himml et al.

(10) Patent No.: US 12,718,051 B2
(45) Date of Patent: Aug. 25, 2026

(54) HANDLING DEVICE FOR HANDLING DATA CARRIERS COMPRISING A DATA CARRIER MODULE AND MANUFACTURING FACILITY WITH THE SAME

(71) Applicant: Giesecke+Devrient ePayments GmbH, Munich (DE)

(72) Inventors: Stefan Himml, Munich (DE); Michael Gunther, Munich (DE); Michael Baldischweiler, Munich (DE); Wilhelm Bumes, Munich (DE)

(73) Assignee: Giesecke+Devrient ePayments GmbH, Munich (DE)

( * ) Notice: Subject to any disclaimer, the term of this patent is extended or adjusted under 35 U.S.C. 154(b) by 0 days.

(21) Appl. No.: 19/071,426

(22) Filed: Mar. 5, 2025

(65) Prior Publication Data

US 2025/0284919 A1 Sep. 11, 2025

(30) Foreign Application Priority Data

Mar. 6, 2024 (DE) ........................ 102024106502.8

(51) Int. Cl.
*G06K 19/077* (2006.01)
*G06K 13/08* (2006.01)

(52) U.S. Cl.
CPC ................................ *G06K 19/0772* (2013.01)

(58) Field of Classification Search
CPC ............... G06K 7/0008; G06K 7/0021; G06K 7/10237; G06K 7/0013; G06K 7/1413; G06K 7/10158; G06K 7/087; G06K 7/10881; G06K 7/0026; G06K 7/0056; G06K 7/0082; G06K 19/07743; G06K 7/10326; G06K 7/0069; G06K 7/0095; G06K 19/06037; G06K 7/0004; G06K 19/07769; G06K 7/1417; G06K 7/10297;
(Continued)

(56) References Cited

U.S. PATENT DOCUMENTS 5,428,213 A * 6/1995 Kurihara ................ G11B 23/50
235/475
5,463,210 A 10/1995 Imura
(Continued)

FOREIGN PATENT DOCUMENTS

DE 3916783 A1 4/1990
DE 102005045567 A1 3/2007
(Continued)

OTHER PUBLICATIONS

Charge/Discharge effects and ESD prevention at the example of RFID smart card manufacturing (Year: 2017).*
(Continued)

*Primary Examiner* — Thien T Mai
(74) *Attorney, Agent, or Firm* — Lindsay N. Kandow

(57) ABSTRACT

The present disclosure relates to a handling device for handling portable data carriers, in particular chip cards, having a data carrier module, and to a manufacturing facility for manufacturing, in particular personalizing, portable data carriers. A corresponding handling device is provided with a transport device which defines a transport plane along which the data carriers are to be transported in a transport direction.

20 Claims, 1 Drawing Sheet

(58) Field of Classification Search
CPC ......... G06K 7/10198; G06K 19/07363; G06K 7/08; G06K 19/07735; G06K 7/006; G06K 7/10386
See application file for complete search history.

(56) References Cited

U.S. PATENT DOCUMENTS

| | | | | |
|---|---|---|---|---|
| 2006/0118229 | A1 | 6/2006 | Ohashi et al. | |
| 2007/0240304 | A1 | 10/2007 | Eisenhardt et al. | |
| 2009/0017663 | A1* | 1/2009 | Oonishi | G06K 13/0875 439/325 |
| 2010/0112835 | A1 | 5/2010 | Matsunaga | |

FOREIGN PATENT DOCUMENTS

| | | | | | |
|---|---|---|---|---|---|
| DE | 102008005320 | A1 | | 7/2009 | |
| DE | 102021109014 | A1 | | 10/2022 | |
| EP | 4328791 | A1 | | 2/2024 | |
| JP | S6294393 | A | * | 4/1987 | |
| JP | 2007193523 | A | | 8/2007 | |
| WO | WO-2005124672 | A1 | * | 5/2010 | G06K 13/08 |
| WO | WO-2010052755 | A1 | * | 5/2010 | G06K 13/08 |
| WO | 2020008569 | A1 | | 7/2018 | |

OTHER PUBLICATIONS

Design and implementation of a card reader based on build-in camera (Year: 2004).*

Fraser Anit-Static Techniques; 101/201 Static Dischargers; Issue 6; Bampton; 2020. 2 S. Firmenschrift; URL:https://fraser-antistatic.com/wp-content/uploads/2020/07/101_201-DS-Iss. 6-EN.pdf [abgerufen am Nov. 29, 2024].

* cited by examiner 1
3
4
31
32
30
R
33
22,GND
22,VCC
22,RST
22,CLK
K
21
5
20
6
2
T
Z
Y
X 1
3
4
31
32
30
33
22,GND
21
22,VCC
22,RST
22,CLK
41
42
43
40
51
K
52
5
6
2
20
50
L
Z
Y
X
T

HANDLING DEVICE FOR HANDLING DATA CARRIERS COMPRISING A DATA CARRIER MODULE AND MANUFACTURING FACILITY WITH THE SAME

CROSS REFERENCE TO RELATED DOCUMENT(S)

This application claims priority to DE Application No. 102024106502.8 entitled "Handling Device For Handling Data Carriers Comprising A Data Carrier Module And Manufacturing Facility With The Same" and filed on Mar. 6, 2024, which application is incorporated by reference in its entirety.

TECHNICAL FIELD

The present disclosure relates to the prevention of electrostatically induced damage or preliminary damage to data carrier modules accommodated in portable data carriers. In particular, the present disclosure relates to a handling device for handling portable data carriers, in particular chip cards, comprising a data carrier module, and to a manufacturing facility for manufacturing, in particular personalizing, portable data carriers, such as chip cards.

BACKGROUND

Portable data carriers are known from the state of the art and can be used, for example, for cashless payment of goods or services, for personal identification and/or for access to Internet-based application programs. Accordingly, there are, for example, card-shaped data carriers in the form of chip cards in general, payment cards, such as credit cards or debit cards, as well as ID cards or identity cards. Such data carriers usually comprise a data carrier module with an electronic circuit in an electronic component, such as a chip, which can be accessed in order to read data from it and, based on this, allow a legitimate owner of the data carrier to perform and/or authorize a specific action.

Production and personalization of portable data carriers, such as chip cards, including bank cards, credit cards, ID documents, health cards and membership cards, requires their passage through machine processing units. These machines use various means of transportation such as conveyor belts, rollers and barrels. As they pass through the machine, it is inevitable that the means of transportation (conveyors, rollers and barrels) will touch the card body at various points, possibly even the area of the metal chip module that houses a sensitive semiconductor device.

DE 10 2005 045567 A1 relates to a method for producing a card-shaped data carrier which has a card body made of plastic. The method is characterized by the fact that a structure of a tool is formed into the surface of the card body, thereby forming an inscription area which is intended for inscription by means of an inscription liquid and has a surface structure predetermined by the tool. In one variant of the method, a roller is used on the surface of which an embossed structure is formed. To create the surface structure in the labeling area of the card body, the roller is pressed against the card body and unrolled over the surface of the card body. This imprints the embossing structure into the surface of the card body.

DE 10 2008 005320 A1 proposes various methods for producing a card-shaped data carrier directly in ID-000 format (plug-in) and how the manufacturing process can be combined with the insertion of security features, individualization data and personalization data. A card body with ID-000 dimensions is connected directly to the back of a film carrier or modular tape, for example by molding or injection molding. The film carrier can be transparent or semi-transparent. The card body can be marked and labeled through the film carrier using laser radiation.

DE 10 2021 109014 A1 also describes a calender transport roller for a calendering device for the production of electrodes for a battery cell, in particular for a lithium-ion battery cell, which serves to convey an electrode strip to or from a pair of calendering rollers, the electrode strip having a flat conductor strip and a coating applied to it in sections at least on the side facing the transport roller, wherein the transport roller has a contact area on its lateral surface which can be touched by the electrode strip, has at least one adjustment section in its contact area and an expansion device is provided which changes the diameter of the transport roller in the adjustment section so that a height difference between a coated section of the electrode strip and an adjacent uncoated section of the electrode strip is equalized. In an alternative embodiment, the transport roller has in its contact area at least one adjustment section with at least one prefabricated adjustment ring, in which the diameter of the transport roller can be changed in such a way that a height difference between a coated section of the electrode strip and an adjacent uncoated section of the electrode strip is equalized.

SUMMARY

The present disclosure provides methods for manufacturing and/or personalizing portable data carriers in which discharge damage is avoided. One or more embodiments enable safe handling of the portable data carriers while avoiding discharge damage.

Features described herein in relation to devices and systems as well as corresponding elements can be implemented as methods and their steps or vice versa. Sections of the description relating to devices and systems therefore also analogously apply to manufacturing or personalization methods for portable data carriers. In particular, any functions of the devices and systems can be implemented as process steps and process steps and components mentioned in connection therewith can be implemented as functions of the devices and systems.

A handling device for handling portable data carriers, in particular chip cards, having a data carrier module, is provided, having a transport device which specifies a transport plane along which the data carriers are to be transported in a transport direction and in the process are to be contacted by at least one handling member, the at least one handling member being arranged offset to the transport direction, designed and/or provided with a recess relative to the transport plane in such a way that simultaneous contacting of different contact surfaces of the data carrier module is avoided.

A manufacturing facility for the production, in particular personalization, of portable data carriers, such as chip cards, is provided, which comprises a corresponding handling device.

Thereby, the portable data carriers can pass through the manufacturing facility without the handling elements, for example transport means such as rollers, barrels, brushes, etc., coming into unfavorable contact with the data carrier module with the sensitive semiconductor component. For example, the handling element can be arranged at an angle to the transport direction. Standard transport rollers and rollers can be modified in such a way that their transport function is retained and at the same time any contact with the data carrier module is avoided. This can be achieved by machining parts of the transport rollers, resulting in alternative roller designs.

Correspondingly modified handling devices also enable the chip card to be transported efficiently through the manufacturing facility without directly contacting certain contact surfaces of the data carrier module. This protects the semiconductor elements contained in the data carrier module from discharge damage. At the same time, the mechanical load on the data carrier module can be minimized. This can be helpful within the context of increasingly delicate manufacturing processes for data carrier modules, including thinner bonding wires and the use of more cost-efficient materials instead of conventional expensive gold.

One or more embodiments of the present disclosure can therefore also prevent discharge damage to semiconductors and mechanical stress on data carrier modules, which significantly improves the overall service life and functionality of many data carriers, leading to a reduction in failure rates and replacement costs. One or more embodiments of the present disclosure can be applied to various machine types and manufacturers. As discharge damage is reduced, One or more embodiments of the present disclosure contributes to sustainability by reducing the waste of defective smart cards and thus saving resources.

According to one embodiment of the handling device, it is provided that the handling element is arranged and/or designed in such a way that simultaneous contacting of a reset contact ("RST") and a clock contact ("CLK") of the data carrier module is being avoided. This can at least prevent semiconductor elements connected to the reset contact and the clock contact from being exposed to any electrostatic discharges. In this way, static discharge damage can be specifically avoided or at least minimized.

According to one embodiment of the handling device, it is provided that the recess is arranged in an edge area of the handling element. In this way, the recess can be easily attached to the handling element. This means that existing or used handling elements can be specifically modified in such a way that discharge damage can be avoided or at least minimized.

According to one embodiment of the handling device, the handling element is stepped in the direction towards the transport plane and/or against the transport direction. The stepped design allows a targeted offset arrangement of the handling element in relation to the transport direction. In this way, unwanted contact with the data carrier module can be avoided in a targeted and efficient manner.

According to one embodiment of the handling device, it is provided that the handling member has at least one contact leg projecting against the transport direction, which is designed to contact at least one of the contact surfaces of a data carrier module moving in the transport direction before other sections of the handling member contact the data carrier module. The position of the handling element can be selected so that it is a vertically mirrored L-shape, i.e. it has two legs connected via a yoke, which project away from the yoke in the opposite direction to the transport direction. In this case, the area of the lower leg first touches the VCC and GND areas of the data carrier module. Once the connection between the handling element and GND has been established, the long leg of the ESD brush touches the "RST" and "CLK" areas.

Alternatively, or additionally, the handling element can stand perpendicularly to the card, but have a leg that is at least 3 mm wide and 5 mm long on the chip card side, for example. In this case, this leg also first touches the "VCC" and "GND" areas. Only afterwards, the handling element touches the other module areas. If the data carrier module needs to be contacted, the contact can therefore be made in such a way that any electrostatic discharges can run off without causing damage. Discharge damage can thus be further avoided or at least minimized.

According to one embodiment of the handling device, it is provided that the handling member comprises a transport roller whose outer circumferential surface is provided with the recess all the way around. The transport roller can therefore make targeted contact with the portable data carrier with its areas remaining next to the recess. In this way, discharge damage can be further avoided or at least minimized.

According to one embodiment of the handling device, it is provided that a part of the transport roller is removed in the area of the recess. For example, the part of the transport roller can be machined to remove it. In this way, the recess can be easily arranged at the handling device. This means that existing or used handling elements can be modified in such a way that discharge damage can be avoided or at least minimized.

According to one embodiment of the handling device, it is provided that the handling element comprises an ESD brush. The ESD brush can be provided with the above-mentioned modifications in such a way that any electrostatic charges can be specifically avoided or at least safely discharged. In this way, discharge damage can be further avoided or at least minimized.

According to one embodiment of the handling device, the handling element is provided with an insulating coating for electrical insulation from the data carrier module and/or with a discharging coating for safely discharging any electrostatic charges from the data carrier module. The handling element can thus be designed in such a way that any electrostatic charges can be specifically avoided or at least safely dissipated. In this way, discharge damage can be further avoided or at least minimized.

DETAILED DESCRIPTION

Figures 1, 2:
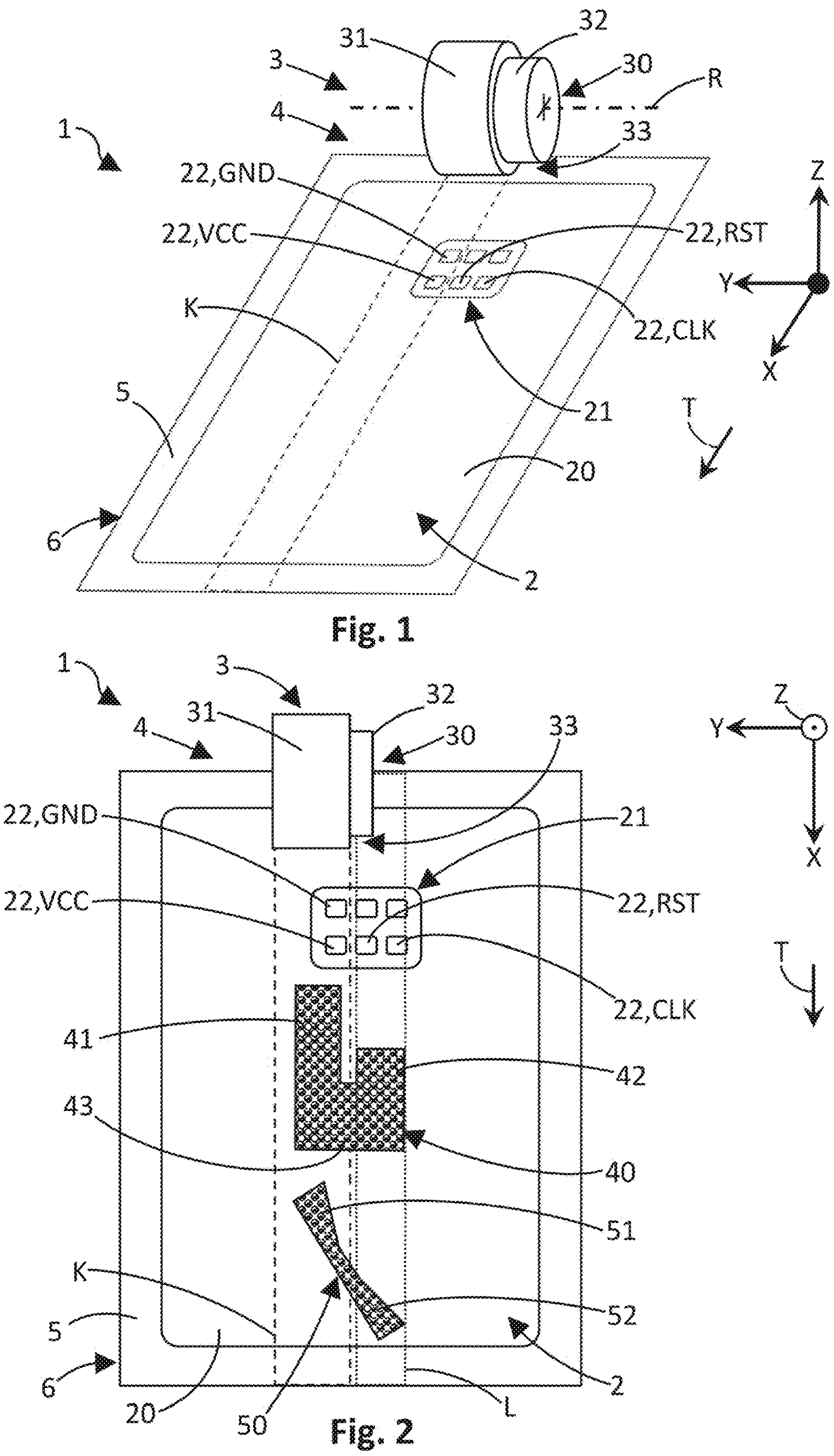
FIG. 1 shows a schematic perspective view of a manufacturing facility for portable data carriers with a handling device.
FIG. 2 shows a schematic top view of the manufacturing facility shown in FIG. 1.

The illustrations in the figures are schematic and not to scale. If the same reference signs are used in different figures in the following description of the figures, they designate the same or similar elements. However, identical or similar elements may also be designated by different reference signs.

FIG. 1 shows a schematic perspective view of a manufacturing facility 1 for portable data carriers 2 with a handling device 3 and a transport device 4, which defines a transport plane 5 and can comprise the handling device 3 and/or at least interact with it. The transport device 4 specifies a transport direction T and comprises the handling device 3 and a processing table 6, which can be part of a corresponding processing section 6 with processing means (not shown). The longitudinal direction X, a transverse direction Y and a vertical direction Z of the manufacturing facility 1 or the portable data carrier 2 together span a Cartesian coordinate system.

The portable data carrier 2 comprises, among other things, a carrier body 20 and a data carrier module 21, for example in the form of a chip module, which can comprise electronic semiconductor elements (not shown). The data carrier module 21 has a plurality of contact surfaces 22, which can comprise a voltage contact VCC, a ground contact GND, a reset contact RST and a clock contact CLK. The portable data carrier 2 can be moved relative to or along the transport plane 5 by means of and/or under the action of the handling device 3 along the transport direction T, which can, for example, extend parallel to the longitudinal direction X of the manufacturing facility 1 or of the portable data carrier 2.

The handling device 3 comprises a handling member 30. The handling member 30 is present here in the form of a transport roller, which has a first cylindrical section 31 and a second cylindrical section 32, which can be designed to rotate about an axis of rotation R of the handling member 30. The first cylindrical section 31 has a larger diameter than the second cylindrical section 32. As a result, a recess 33 is formed on the handling member 30 in the region of the second cylindrical section 32.

During operation of the transport device 4, the first cylindrical section 31 of the handling member 30 can contact the portable data carrier 2 in a contact area K. Contact area K can be selected in such a way that the handling member 30 does not contact any of the contact surfaces 22 at the same time. For example, the handling member 30 can contact only the voltage contact VCC and the ground contact GND in succession while the portable data carrier 2 passes through the manufacturing facility 1 in the transport direction T, since these are located in the contact area K. In other words, the handling member 30 does not come into contact with the portable data carrier 2 or, in particular, its contact surfaces 22, for example the clock contact CLK and/or the reset contact RST, which are thus arranged outside the contact area K, in the region of the recess 33.

FIG. 2 shows a schematic top view of the manufacturing facility 1 shown in FIG. 1, which, in addition to the handling member 30, comprises a further handling member 40 and an additional handling member 50, which may be in the form of ESD brushes. The additional handling member 40 and has a first leg 41 and a second leg 42, which can be connected to each other via a yoke 43. The first leg 41 can protrude from the yoke or relative to the second leg 42 in the opposite direction to the transport direction T such that, as the portable data carrier 2 passes through the manufacturing facility 1, it first contacts selected contact surfaces, such as, for example, first the voltage contact VCC and then the ground contact GND, which are then contacted simultaneously for a certain period of time before other contact surfaces 22 are contacted. Meanwhile and/or subsequently, the second leg 42 can contact remaining contact surfaces 22, such as the reset contact RST and/or the clock contact CLK, when the portable data carrier 2 passes through the manufacturing facility 1 in the transport direction T.

The additional handling member 50 can be arranged at an angle to the transport direction T in such a way that it has a forward contact section 51 and a rear contact section 51. Similar to the first leg 41 and the second leg 42 of the additional handling member 40, the full contact section 51 can protrude relative to the rear contact section 52 in the opposite direction to the transport direction T in such a way that it first contacts selected contact surfaces as the portable data carrier 2 passes through the manufacturing facility 1, such as first the voltage contact VCC and then the ground contact GND, which are then contacted simultaneously for a certain period of time before other contact surfaces 22 are contacted. In the meantime, and/or subsequently, the rear contact section 52 can contact remaining contact surfaces 22, such as the reset contact RST and/or the clock contact CLK, when the portable data carrier 2 passes through the manufacturing facility 1 in the transport direction T.

The first leg 41 of the further handling member 40 and/or the forward contact section 51 of the additional handling member 50 can be arranged in the contact area K or can overlap with it and/or form it at least partially. The second leg 42 of the additional handling member 40 and/or the rear contact section 52 of the additional handling member 50 can be arranged in a further contact area L or can overlap with it and/or at least partially form it. The contact area K can be designed for successive contacting of selected contact surfaces 22 and/or the further contact area L can be designed for simultaneous or overlapping contacting of selected contact surfaces 22.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word “exemplary” means “serving as an example, instance, or illustration.” Details of the exemplary embodiments or other limitations described above should not be read into the claims absent a clear intention to the contrary. Any implementation described herein as exemplary is not necessarily to be construed as preferred or advantageous over other implementations, and the exemplary embodiments described herein are not intended to limit the scope or applicability of the subject matter in any way. Accordingly, it should be appreciated that the exemplary embodiment or embodiments described herein are not intended to limit the scope, applicability, or configuration of the claimed subject matter in any way. Rather, the foregoing detailed description will provide those with ordinary skill in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

For example, one or more embodiments can be configured to overcome a disadvantage of other methods for manufacturing and personalizing portable data carriers is that electrical charge is built up on the data carriers due to friction during transport of the portable data carriers in the respective manufacturing facilities. As a result, uncontrolled electrical discharges of the portable data carriers can occur, which can lead to damage to the semiconductor elements contained in the data carrier module, particularly in the event of sudden discharges. Although ionizers and electrostatic discharge brushes (ESD brushes) are regularly used to minimize this potential risk, spontaneous discharges can occur despite these measures, for example when transport rollers run directly over the chip module. In previous approaches, discharge damage to portable data carriers resulting from this cannot be easily detected. It is often the case that the data carrier modules are only pre-damaged, but at least initially still function in principle. However, they are extremely sensitive to further discharges and tend to fail earlier during their lifetime in the field.

It is claimed:

1. A handling device for handling portable data carriers each including a data carrier module having a plurality of contact surfaces, said handling device comprising:

at least one handling member configured to contact the data carrier module; and a transport device that defines a transport plane along which the portable data carriers are to be transported in a transport direction;

wherein the at least one handling member is at least one of arranged offset with respect to the transport direction and provided with a recess relative to the transport plane such that simultaneously contacting different contact surfaces of the plurality of contact surfaces of the data carrier module is avoided.

2. The handling device of claim 1, wherein the at least one handling member is arranged in such a way that simultaneously contacting a reset contact surface and a clock contact surface of the plurality of contact surfaces of the data carrier module is avoided.

3. The handling device of claim 1, wherein the recess is arranged in an edge region of the at least one handling member.

4. The handling device of claim 1, wherein the at least one handling member is shaped in a stepped manner in a direction towards the transport plane and against the transport direction.

5. The handling device of claim 1, wherein the at least one handling member has at least one contact leg projecting against the transport direction, which is designed to contact at least one of the plurality of contact surfaces of the data carrier module moving in the transport direction before the at least one handling member contacts another contact surface of the plurality of contact surfaces of the data carrier module.

6. The handling device of claim 1, wherein the at least one handling member comprises a transport roller, the outer circumferential surface of which is circumferentially provided with the recess.

7. The handling device of claim 6, wherein a part of the transport roller is removed in the region of the recess.

8. The handling device of claim 1, wherein the at least one handling member comprises an electrostatic discharge brushes (ESD) brush.

9. The handling device of claim 1, wherein the at least one handling member is provided with an insulating coating for electrical insulation from the data carrier module and with a discharging coating for safely discharging any electrostatic charges from the data carrier module.

10. A manufacturing facility for manufacturing and personalizing portable data carriers, said manufacturing facility comprising:

a handling device for handling portable data carriers each including a data carrier module having a plurality of contact surfaces;

wherein the handling device comprises at least one handling member configured to contact the data carrier module, and a transport device that defines a transport plane along which the data carriers are to be transported in a transport direction;

wherein the at least one handling member is at least one of arranged offset with respect to the transport direction and provided with a recess relative to the transport plane such that simultaneously contacting different contact surfaces of the plurality of contact surfaces of the data carrier module is avoided.

11. The manufacturing facility of claim 10, wherein the at least one handling member is arranged in such a way that simultaneously contacting a reset contact surface and a clock contact surface of the plurality of contact surfaces of the data carrier module is being avoided.

12. The manufacturing facility of claim 10, wherein the recess is arranged in an edge region of the at least one handling member.

13. The manufacturing facility of claim 10, wherein the at least one handling member is shaped in a stepped manner in a direction towards the transport plane and against the transport direction.

14. The manufacturing facility of claim 10, wherein the at least one handling member has at least one contact leg projecting against the transport direction, which is designed to contact at least one of the plurality of contact surfaces of the data carrier module moving in the transport direction before the at least one handling member contacts another contact surface of the plurality of contact surfaces of the data carrier module.

15. The manufacturing facility of claim 10, wherein the at least one handling member comprises a transport roller, the outer circumferential surface of which is circumferentially provided with the recess.

16. The manufacturing facility of claim 15, wherein a part of the transport roller is removed in the region of the recess.

17. The manufacturing facility of claim 10, wherein the at least one handling member comprises an electrostatic discharge brushes (ESD) brush.

18. The manufacturing facility of claim 10, wherein the at least one handling member is provided with an insulating coating for electrical insulation from the data carrier module and with a discharging coating for safely discharging any electrostatic charges from the data carrier module.

19. The handling device of claim 1, wherein the portable data carriers include chip cards.

20. The manufacturing facility of claim 10, wherein the portable data carriers include chip cards.

* * * * *